July 10, 1951  W. R. RAMSAUR ET AL  2,560,245
TWO PORT COOLER

Filed Nov. 15, 1946  2 Sheets-Sheet 1

INVENTORS
WALTER R. RAMSAUR
RAYMOND W. JENSEN

BY
ATTORNEY

July 10, 1951  W. R. RAMSAUR ET AL  2,560,245
TWO PORT COOLER
Filed Nov. 15, 1946   2 Sheets-Sheet 2
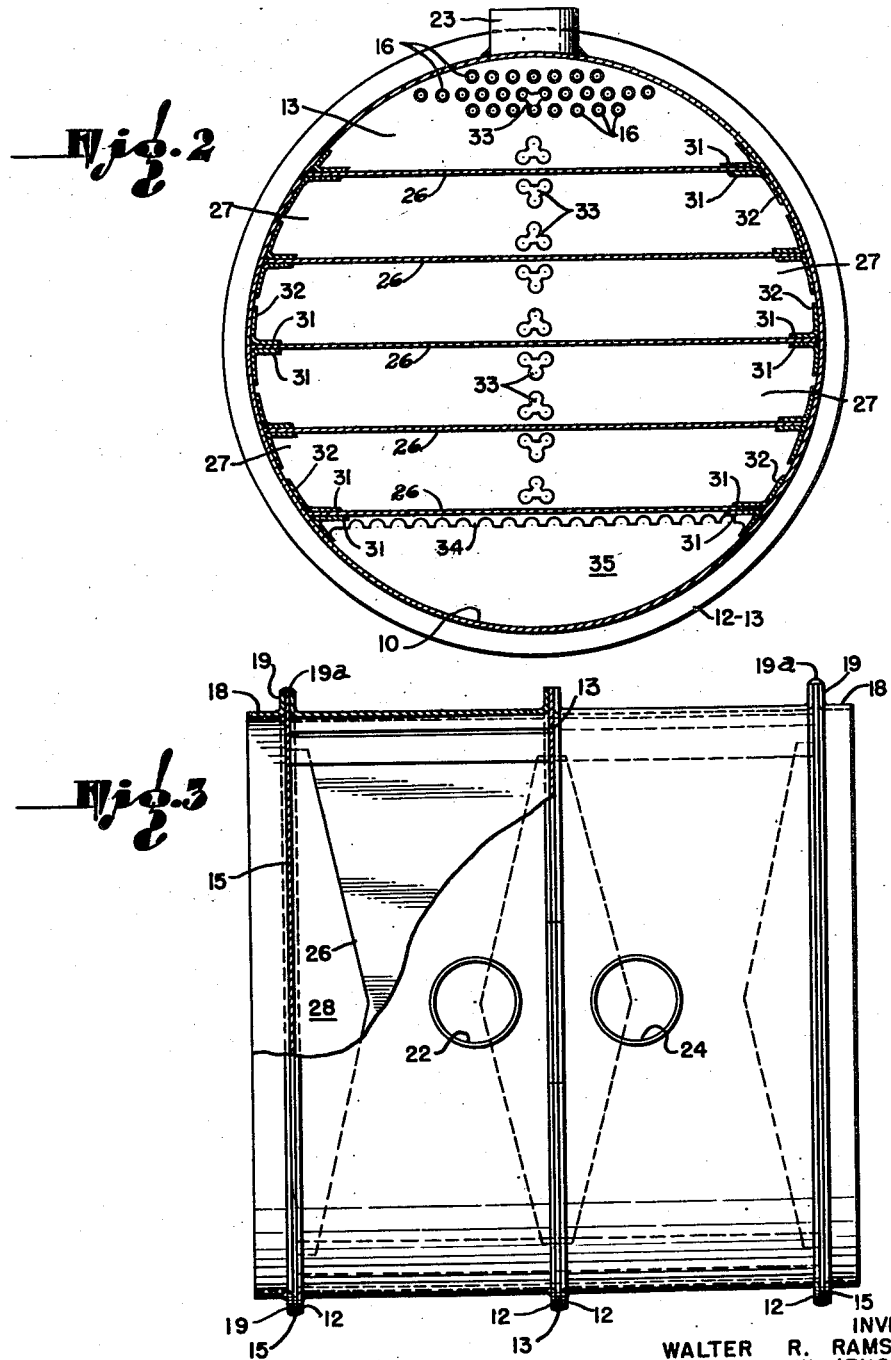
INVENTORS
WALTER R. RAMSAUR
RAYMOND W. JENSEN
BY
ATTORNEY Patented July 10, 1951

2,560,245

UNITED STATES PATENT OFFICE 2,560,245

TWO-PORT COOLER

Walter R. Ramsaur and Raymond W. Jensen, Los Angeles, Calif., assignors to The Garrett Corporation, Los Angeles, Calif., a corporation of California Application November 15, 1946, Serial No. 709,950

4 Claims. (Cl. 257—128)

This invention relates to heat exchangers and is particularly useful in connection with the temperature conditioning of lubricating oil for internal combustion engines for aircraft, which are submitted to widely varying conditions of temperature and temperature change. The general object of the invention is to provide an improved heat exchanger, and a particular object of the invention is to provide an improved oil cooler for aircraft.

A primary function of an oil cooler is to remove excess heat from the oil as it comes in a heated condition from the engine and to return the oil to the engine in a proper condition of temperature and viscosity. An aircraft cooler must be capable of reliably carrying out this function both when the temperature of the atmosphere is high (placing a high cooling load on the cooler) and when the temperature of the atmosphere is extremely low (giving rise to the problem of congealment of the oil against the walls of the heat exchange passages of the cooler). It must therefore be capable of handling not only mild variations in temperature, but also extremes of temperature change.

It is also desirable to provide means for by-passing the cooler passages when the viscosity of the oil becomes too great, and to provide means for decongealing the congealed oil in said core passages. This is accomplished by providing a centrally located baffle or tube supporting plate in the cooler having openings therein along a diametrical line following the general direction of the oil flow path or along the line of intersection therewith of an axial plane passing through the inlet and outlet of the cooler shell.

Under some operating conditions there may be an extremely rapid temperature drop, or the temperature may reach such a low stage that the oil in the core becomes highly congealed. It may then become necessary to bypass at least some of the oil directly from the cooler inlet to the cooler outlet so as to relieve the core of excessive pressure, or it may be necessary to bypass the core completely and close the ports leading to it. The necessity for such a shortened bypass may also arise from sudden surges at the cooler inlet. The present invention contemplates an oil cooler having all of the above mentioned functions, and it is another object of the invention to provide a relatively simple and compact two-port oil cooler of this character.

Further objects and advantages of the invention will be brought out in the following part of the specification.

Referring to the drawings, which are for illustrative purposes only,

Fig. 2 is a sectional view of the cooler, without the valve housing, as viewed on line 2—2 of Fig. 1;

Fig. 3 is a plan view of the cooler, without the valve housing, a portion of the shell being broken away to show the interior construction of the device;

Figure 1:
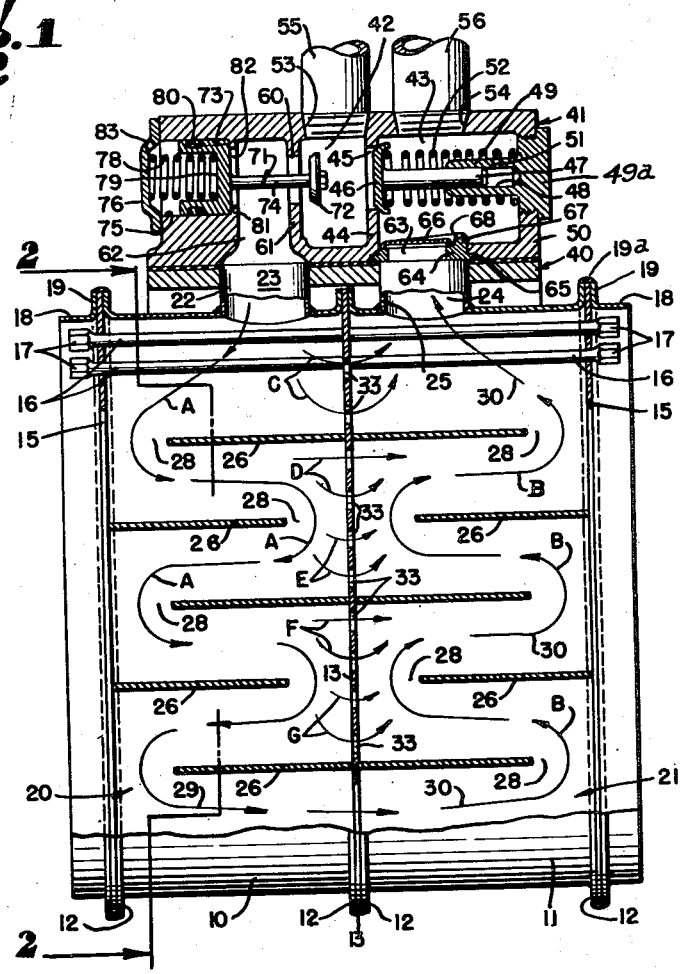
Fig. 1 is an elevational view, partially in section, of an oil cooler embodying the present invention.

Referring now to Figs. 1 and 3, there is shown a tubular or cylindrical shell comprising a tubular section 10 and a tubular section 11. The ends of each shell section are turned outwardly to provide annular flanges 12, and between the adjacent ends of the shell sections there is secured a perforated center or intermediate tube supporting plate or wall 13. The parts may be secured together in any suitable manner, but as shown, said parts are welded adjacent the peripheral edges of the flanges 12 and the plate 13.

The outer end of each shell section is closed by an end plate 15 which is perforated for reception of the adjacent ends of thin walled radiator tubes 16, which extend longitudinally of the shell in the usual manner. The ends of the tubes are provided with ferrules 17 which are secured in the ends of said tubes in a manner known in the art. In the embodiment shown in Figs. 1 to 4, the tube receiving perforations in the intermediate plate 13 all snugly receive respective tubes so that substantially no oil will flow through said perforations.

Means for mounting the cooler may be provided, and as shown comprises tubular mounting flanges 18 having outwardly extending annular flanges 19 which abut against the peripheral edge portion of the adjacent end plate 15. The outer flanges 12, end plates 15, and flanges 19 are secured together by a weld extending peripherally thereof.

With the above construction in mind, it will be apparent that the shell of the cooler is divided into a pair of compartments 20 and 21. The compartment 20 may be termed the inlet compartment, and is provided with an inlet opening 22 communicating with a short inlet conduit 23, and the compartment 21 may be termed the outlet compartment, which has an outlet opening 24 communicating with an outlet conduit 25. Within each of the compartments 20 and 21 there are a plurality of substantially parallel baffles 26 extending longitudinally of the shell. The baffles are spaced apart to form a plurality of oil chambers 27 and successive chambers communicate with adjacent chambers by means of ports 28 alternately arranged in the baffles 26, so that the series of chambers 27 provide a tortuous channel or flow path, indicated by the arrows 29 and 30, through the compartments 20 and 21 respectively. The ports 28 in the baffles are wedge-shaped, as best shown in Fig. 3, with the base portions of said openings extending substantially across the entire width of the baffles, and with the apex or deepest part of the notch adjacent the longitudinal center of the baffle, said ports providing a flow path which gradually decreases in length toward the longitudinal center thereof.

Means for securing the baffles in the shell are provided, and comprises a plurality of substantially parallel flanges 31 of angle pieces having their other sides 32 welded to the interior surface of the respective shell sections. The edge portions of the baffles are disposed between the flanges 31 and are secured thereto by welding or other suitable means.

Figure 4:
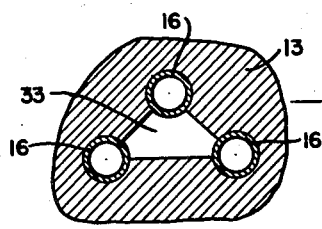
Fig. 4 is an enlarged fragmentary view showing a bypass opening in the center plate.

The device is provided with bypass means which, as best shown in Figs. 2 and 4, comprises passages 33 in the center wall or plate 13, which passages are formed by cutting out a section of the plate between three adjacent tube openings, so that said bypass passages are generally triangular in shape. A single row of said bypass passages are provided along a line diametrical of the shell and extending along the line of intersection therewith of an axial plane passing through the inlet and outlet, 22 and 24 respectively, of the device, said line being substantially vertical as shown in Fig. 2 of the drawings.

The lower end of the plate 13 has a portion cut away, along a line indicated at 34, so as to provide a substantially full flow crossover passage 35 between the lowermost chamber 27 of the inlet compartment and the lowermost chamber of the outlet compartment.

A flange 40 is secured, by welding or the like, to the outer ends of the conduits 23 and 25, and provides means for attaching a valve housing, indicated generally at 41, by means of bolts or the like, not shown.

The housing 41 has an inlet oil receiving chamber 42 and an outlet chamber 43 separated by a partition 44 having a port 45 therein which is controlled by a poppet valve 46 opening inwardly of the outlet chamber 43. The poppet valve includes a stem 47 slidably received in a bore 48 of a sleeve 49 extending inwardly of a plug 49a screwed into the outer wall 50 of the housing, there being a pressure relief vent 51 in the boss to prevent a pressure condition behind the adjacent end of the valve stem such as would impede the proper functioning of the valve 46. A spring 52 reacts between the valve 46 and the adjacent side of the plug 49a for normally maintaining said valve in a position for closing the port 45.

The cooler is provided with a threaded opening 53 which communicates with the inlet chamber 42, and there is a threaded opening 54 for the outlet chamber 43. In the opening 53 is threadably received the end of an oil delivery pipe or conduit 55 which carries oil from the engine to the cooler. An outlet pipe 56 is threadably received in the opening 54 for conveying oil from the cooler back to the engine or to an oil reservoir or the like, not shown.

Oil enters the cooler shell from the chamber 42, by way of a port 60 in a partition wall 61, and a chamber 62, which communicates with the inlet conduit 23 of the cooler shell. Oil leaving the compartment 21 of the cooler passes through the outlet port 24 of the shell and outlet conduit 25 which communicates with the outlet chamber 43, through a port 63 of a check valve comprising a valve seat 64 secured between the fixture 40 and a shoulder 65 at the bottom of a recess provided in the valve housing 41. The check valve includes a movable disc-like valve member 66 which is pivoted at 67 on an ear 68 of the valve seat 64.

The port 60 is controlled by a surge valve, indicated generally at 71, which includes a poppet type valve head 72 opening inwardly of the chamber 42. The valve head 72 is connected with a piston 73 by means of a stem 74, said piston being slidable in a cylinder 75 formed in the housing 41, the outer end of said cylinder being closed by a cap 76 which is attached to said housing by means of screws, not shown. The valve 71 is held in the open position by means of a spring 78 which reacts between the cap 76 and the bottom of a chamber 79 formed in the piston 73, the latter having a ring or seal 80 to prevent the escape of oil, said piston being limited in the spring urged direction by an annular flange 81 formed integrally with the housing about the inner end of said cylinder, there being an opening 82, defined by the interior edge of the flange, through which the stem 74 extends. It is desirable to vent the cylinder 75 to atmosphere by means of an opening 83 in the cap 76 for the relief of pressure behind the piston.

Under normal operating conditions the oil follows the normal flow path entering the cooler through the conduit 55, passing into the inlet chamber 42, through the port 60 and chamber 62, and thence into the inlet 22 of the shell by way of the inlet conduit 23. From there the oil follows the course of the arrows A, passing through the ports 28 at the ends of the respective baffles 26 in the inlet compartment. After traversing the inlet compartment and reaching the crossover passage 35 at the bottom of the cooler, the oil enters the inlet chamber (shown at the bottom of the device in Figs. 1 and 2) of the outlet compartment, and follows the course, indicated by the arrows B, through the chambers 27 and respective ports 28 of the baffles 26. When the oil reaches the upper or outlet chamber of the outlet compartment, it passes through the outlet 24, through the outlet conduit 25, past the check valve 66, and thence into the outlet chamber 43 of the housing and out of the cooler by way of the conduit 56.

Should the oil in the cooler core become congealed, the hot oil from the engine will enter the upper or inlet chamber 27 of the inlet compartment and follow the course indicated by the arrows C through the openings 33 in the central baffle 13. Thence it will flow into the upper or outlet chamber 27 of the outlet compartment and leave the cooler by way of the outlet 24, conduit 25, outlet chamber 43 and conduit 56.

The last described course or path of oil flow results from the substantial blocking of the flow of oil through the remaining part of the cooler due to its congealed condition. However, as the warm oil follows the course indicated by arrows C, the oil in the next succeeding chamber 27 of the inlet compartment and adjacent chamber 27 of the outlet compartment will be gradually warmed until the oil from the engine can force its way through the port 28 of the upper baffles 26 and pass into said succeeding chamber 27 of the inlet compartment and adjacent or opposite chamber of the outlet compartment. Thereupon it will follow the course indicated by arrows D through the openings 33 which communicate between the respective chamber 27 of the inlet and outlet compartments. Thence the oil will flow into the outlet chamber 27 of the outlet compartment, through the port 28 of he upper baffle 26, and will pass out of the cooler along the usual flow path. The succeeding steps of decongealment occur in a similar manner so that the oil progressively will flow through the respective openings 33 in the central baffle following the respective courses indicated by the arrows E, F and G. By this time all of the oil in the cooler core is decongealed so that the normal flow path will be followed as hereinabove described.

Should there be a sudden surge of oil into the cooler, of such character as to create an excessive pressure within the shell, the oil pressure in chamber 62 will act on the piston 73 and effect closing of the valve 72. Such a surge of oil will also exert a pressure on the valve 46 and cause it to open to permit a direct bypassing of the oil from the chamber 42 into the chamber 43, and at the same time will effect closing of the check valve 66. Thus the cooler is protected against excessive pressures which may result from surging, particularly when the oil in the cooler core is in a congealed condition.

Figure 5:
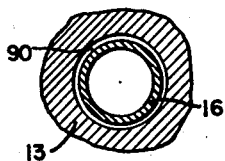
Fig. 5 is an alternative arrangement thereof.

Fig. 5 shows an alternative arrangement for providing bypassing through the central plate or wall 13. In this arrangement certain holes for the cooler tubes are formed somewhat larger than the outer diameter of the tubes 16 so as to provide spaces or passages 90. These enlarged holes or openings 90 extend along a line diametrical of the shell along the line of intersection with the wall 13 of an axial plane passing through the inlet 22 and outlet 24.

Although the cooler has been described as having a plurality of substantially parallel longitudinally extending baffles 26 with wedge-shaped ports 28 located in alternate ends of the baffles to form a tortuous passage for the flow of oil through the cooler, it is to be understood that various changes can be made in the construction thereof without departing from the scope of the invention. For example, the ports 28 may be made any convenient shape or size, or the baffles 26 may be omitted from one or both of the compartments 20 and 21 of the cooler.

We claim:

1. In an oil cooler: means forming a tubular shell; a cooler core within said shell comprising a plurality of thin walled radiator tubes extending longitudinally of the shell; perforated end plates for the shell through which adjacent ends of the tubes extend; a perforated intermediate tube supporting plate substantially parallel with the end plates and dividing the shell into inlet and outlet core sections, the perforations in said intermediate plate being in spaced parallel planes and alternately staggered with respect to adjacent rows, said perforations snugly receiving the respective tubes of the core; means within each core section substantially normal to the intermediate plate and forming a tortuous passage therethrough, said passages being connected together in series; and bypass openings in the intermediate plate spaced apart along a medial line with respect to the flow path, said openings being generally triangular in shape and connecting together a plurality of tube receiving perforations.

2. In an oil cooler: means forming a tubular shell; a cooler core within said shell comprising a plurality of radiator tubes extending longitudinally of said shell; end plates for the shell having perforations through which adjacent tube ends extend; a perforated intermediate tube supporting plate substantially parallel with the end plates and dividing the shell into inlet and outlet core sections, those tube receiving perforations in said intermediate plate along a line extending substantially diametrically of the shell along the flow path being of greater diameter than the tubes to provide bypass openings through said intermediate plate, the remaining perforations in said intermediate plate snugly receiving the respective tubes; and means substantially normal to the plane of the intermediate plate forming tortuous passageways through the respective core sections, said passageways being connected together in series.

3. In an oil cooler: means forming a tubular shell; a cooler core within said shell comprising a plurality of radiator tubes extending longitudinally of said shell; end plates for the shell having perforations through which adjacent tube ends extend; a perforated intermediate tube supporting plate substantially parallel with the end plates and dividing the shell into inlet and outlet core sections, the perforations in said intermediate plate snugly receiving the respective tubes; bypass openings in the intermediate plate spaced along a path substantially diametrically of the shell along the flow path, said openings being generally triangular in shape and connecting together a plurality of tube receiving perforations; and means substantially normal to the plane of the intermediate plate forming tortuous passageways through the respective core sections, said passageways being connected together in series.

4. In an oil cooler: means forming a tubular shell; a cooler core within said shell comprising a plurality of radiator tubes extending longitudinally of said shell; end plates for the shell having perforations through which adjacent tube ends extend; a perforated intermediate tube supporting plate substantially parallel with the end plates and dividing the shell into inlet and outlet core sections, those tube receiving perforations in said intermediate plate along a line extending substantially diametrically of the shell along the flow path being of greater size than the tubes passing therethrough to provide bypass openings through said intermediate plate, the remaining perforations in said intermediate plate snugly receiving the respective tubes; and means substantially normal to the plane of the intermediate plate forming tortuous passageways through the respective core sections, said passageways being connected together in series.

WALTER R. RAMSAUR.
RAYMOND W. JENSEN.

REFERENCES CITED

The following references are of record in the file of this patent:

UNITED STATES PATENTS

| Number | Name | Date |
| --- | --- | --- |
| 1,442,783 | Braun | Jan. 16, 1923 |
| 1,454,053 | Jones | May 8, 1923 |
| 1,992,796 | Young et al. | Feb. 26, 1935 |
| 2,288,598 | Ramsaur | July 7, 1942 |
| 2,293,960 | Young | Aug. 25, 1942 |
| 2,352,704 | Garner | July 4, 1944 |
| 2,354,362 | Burns | July 25, 1944 |
| 2,273,157 | Worth | Apr. 10, 1945 |
| 2,376,198 | Shaw | May 15, 1945 |

Certificate of Correction

July 10, 1951

Patent No. 2,560,245

WALTER R. RAMSAUR ET AL.

It is hereby certified that error appears in the printed specification of the above numbered patent requiring correction as follows:

Column 5, line 6, for "he" read *the*; column 6, line 74, list of references cited, for the patent number "2,273,157" read *2,373,157*; and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*